April 28, 1964     W. DIAN     3,131,008

BICYCLE HUB ASSEMBLY

Filed May 2, 1962

INVENTOR.
WALTER DIAN

BY     ATTORNEYS

United States Patent Office 3,131,008
Patented Apr. 28, 1964

3,131,008
BICYCLE HUB ASSEMBLY
Walter Dian, Downers Grove, Ill., assignor to Excel, Inc., Franklin Park, Ill., a corporation of Illinois
Filed May 2, 1962, Ser. No. 192,001
1 Claim. (Cl. 308—192)

This invention relates to improvements in bicycle hub assemblies and more particularly relates to a self-locking threaded connection for such assemblies.

Bicycle hubs are usually manufactured and assembled with the cones adjusted and are shipped to the bicycle manufacturer so the spokes may be assembled to the hub and rim of the wheel and the wheel may be assembled on the bicycle fork without readjusting the cones.

In shipping the hubs from the hub manufacturer to the bicycle manufacturer, however, the jarring and vibration of shipping frequently loosens the cones so that bearings are out of adjustment when they reach the bicycle manufacturer. Also in a conventional bicycle hub the cones tend to move into the hub when the hub is tightened on the fork of the bicycle, causing adjustment problems which have never satisfactorily been solved. While lock nuts and other similar locking devices have been used to lock the cones in adjustment during shipment, said locking devices are relatively expensive and the cones frequently come out of adjustment when assembling the wheel to the fork and with such locking devices the locking connection must be released if it should be desired to further adjust the cones when assembling the wheel to the fork.

A principal object of the present invention is to provide an improved form of bicycle hub assembly, so arranged as to eliminate all lost motion between the cones and shaft, and to thereby maintain the cones in adjustment when once properly adjusted.

Another object of the invention is to eliminate the adjustment problems in assembling a bicycle wheel to its fork, caused by the ability of the cones to move into the hub when tightened to the fork of a bicycle.

A further object of the invention is to provide an improved form of self-locking threaded connection so arranged that one member when moved along its threads to a certain location displaces the metal of the axle beyond this location, to retain the member in position.

A further object of the invention is to provide a self-locking threaded connection for the cones of bicycle hubs and the like, in which the shaft along which the cones are threaded is threaded for a portion of its length and is knurled or fluted inwardly of the threaded portion thereof, providing a surface along which the cones may displace the metal of the shaft when moved into adjusted relation with respect to the bicycle hub, to eliminate lost motion between the cones and shaft and to retain the cones in the proper positions of adjustment.

A still further object of the invention is to provide a bicycle hub assembly in which the shaft on which the hub is journaled is made from a mild steel and the threads for the cones are rolled on the shaft and in which longitudinally extending knurling or flutes extend inwardly of the threads and form a means along which the cones may cut their own threads to hold the cones in adjusted relation with respect to the shaft and hub and to accommodate further adjustment of the cones where desirable.

These and other objects of the invention will appear from time to time as the following specification proceeds and with reference to the accompanying drawing wherein.

Figure 3:
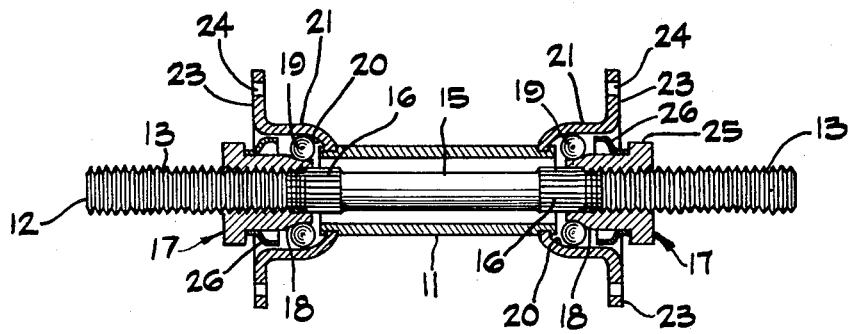
FIGURE 3 is a sectional view taken substantially along line 3—3 of FIGURE 2.
Figure 1:
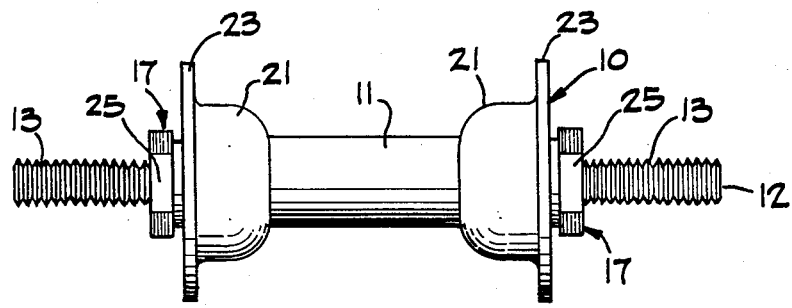
FIGURE 1 is a view of a bicycle hub assembly constructed in accordance with the principles of the present invention.
Figure 2:
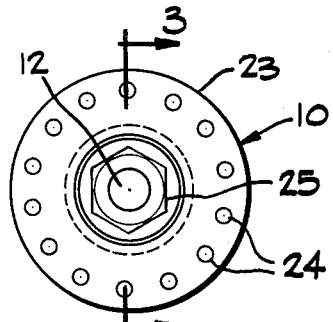
FIGURE 2 is an end view of the bicycle hub assembly shown in FIGURE 1.

In the embodiment of the invention illustrated in the drawing, I have shown a bicycle hub assembly 10 in which a hub 11 is mounted on a shaft 12 for rotation thereabout.

The shaft may be made from a mild steel and has threads 13 extending along each end thereof and extending radially outwardly of a central plain portion 15 of the shaft. The threads 13 are preferably rolled on the shaft and when rolled on the shaft have a larger outside diameter than the shaft proper, as indicated by reference character 15. The process by which the threads are rolled on the shaft may be a conventional rolling process and is no part of the present invention so need not herein be shown or described further.

Extending inwardly of the threads 13 the shaft is knurled to form longitudinally extending flutes 16, the outer surfaces of which are of larger diameter than the inside diameter of the threads of cones 17 threaded on said shaft, and which may be of the same diameter as the threads 13.

The cones 17 are threaded on opposite ends of the shaft and have races 18 formed integrally therewith forming bearing races for balls 19 engaging internal races 20 of generally bell shaped portions 21 of the hub 11.

The balls 19 may be carried in the usual retainers (not shown) and serve to rotatably mount the hub 11 on the shaft 15 for free rotation thereabout. The bell shaped portions of the hubs 21 terminate at their enlarged diameter portions in radial flanges 23, apertured at 24 to receive the spokes of the bicycle wheel.

The cones 17 have generally hexagonal outer heads 25 and are shown as having seals 26 extending inwardly from the inner margins thereof to retain lubricant to the bearings 19 and keep dust from entering said bearings.

In assembling the bicycle hub on the shaft 15, the hub is ball bearings 19 mounted thereon, and retained by the usual bearing retainers or cages (not shown), are threaded on the ends of the shafts within the bell shaped portions 21 of the hub 11. As the cones 17 are moved along first placed along the shaft, and the cones 17 with the the shaft 13 to bring the balls 19 into engagement with the inner races 20, the inner end portions of the cones 17 will pass beyond the threaded portions 13 of the shaft and the cones will displace the metal of the fluted portions 16 and in effect cut their own threads on the shaft, it being understood that since the shaft is made from a mild steel and since the cones are hardened, the cones will readily displace the metal of the fluted portions of the shaft as they are brought into adjustment, and that this displaced metal will hold the cones in adjusted relation with respect to the shaft and will also accommodate further adjustment of the cones, where desirable.

It may be seen from the foregoing that a simple form of self-locking threaded connection has been provided, preventing the loosening of threaded members on a shaft by vibration, that this self-locking threaded connection is particularly effective to retain the cones of bicycle hubs in adjusted relation with respect to the hub, to accommodate shipping of the assembled hub for assembly to the wheel rim, and making it unnecessary to readjust the cones after once adjusted at the place of manufacture, during the assembly of the spokes to the hub and rim of the wheel, and the assembly of the wheel on the fork of the bicycle, and that this self-locking threaded connection also gives the cones the ability to be further adjusted, where necessary.

While I have herein shown and described one form in which my invention may be embodied, it may readily be understood that various modifications and variations in the invention may be attained without departing from the spirit and scope of the novel concepts thereof as defined by the claim appended thereto.

I claim as my invention:

A bicycle hub assembly, comprising a mild steel shaft having threads rolled along opposite end portions thereof and of larger outside diameter than the outside diameter of said shaft, a hub extending about said shaft and having internal bearing races formed integrally therewith, cones having internal threaded portions threaded on the threads on said shaft and having external bearing races cooperating with said internal bearing races, ball bearings spacing said races apart and providing anti-friction bearings mounting said hub to freely rotate about said shaft, and means for maintaining said cones in adjusted relation with respect to said shaft comprising flutes extending longitudinally inwardly along said shaft from the threaded portions thereof and of greater outside diameters than the inside diameters of the threaded portions of said cones and engaged by the threaded portions of said cones and deformed thereby when bringing said cones into adjusted relation with respect to said internal races and thereby locking said cones in adjustment on said shafts.

References Cited in the file of this patent

UNITED STATES PATENTS

| | | |
|---|---|---|
| 1,157,666 | Bennett | Oct. 26, 1915 |
| 1,216,431 | Frazier | Feb. 20, 1917 |
| 1,361,398 | McReida | Dec. 7, 1920 |
| 1,375,149 | Haggerty | Apr. 19, 1921 |
| 1,593,474 | Serrao | July 20, 1926 |
| 1,714,711 | Elkin | May 28, 1929 |
| 1,981,399 | Thomson | Nov. 20, 1934 |
| 2,073,736 | Duffy | Mar. 16, 1937 |
| 2,576,885 | Leighton | Nov. 27, 1951 |